United States Patent
Sakakihara

(10) Patent No.: US 9,158,730 B2
(45) Date of Patent: Oct. 13, 2015

(54) METHOD FOR CONTROLLING INFORMATION PROCESSING SYSTEM, SERVER DEVICE, AND CLIENT DEVICE

(71) Applicant: Fujitsu Limited, Kawasaki-shi, Kanagawa (JP)

(72) Inventor: Hironori Sakakihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 299 days.

(21) Appl. No.: 13/690,672

(22) Filed: Nov. 30, 2012

(65) Prior Publication Data

US 2013/0218950 A1 Aug. 22, 2013

(30) Foreign Application Priority Data

Feb. 20, 2012 (JP) ................................. 2012-034577

(51) Int. Cl.
*G06F 15/16* (2006.01)
*H04W 4/02* (2009.01)

(52) U.S. Cl.
CPC .................. *G06F 15/16* (2013.01); *H04W 4/02* (2013.01); *H04W 4/025* (2013.01); *H04W 4/028* (2013.01)

(58) Field of Classification Search
USPC ........................................................ 709/203
See application file for complete search history.

(56) References Cited

U.S. PATENT DOCUMENTS

2013/0158867 A1* 6/2013 Sidhu et al. ................... 701/472

FOREIGN PATENT DOCUMENTS

| JP | 9-50594 | 2/1997 |
|----|---------|--------|
| JP | 10-221426 | 8/1998 |
| JP | 2003-207556 | 7/2003 |
| JP | 2006-115415 | 4/2006 |
| JP | 2007-134760 | 5/2007 |
| JP | 2010-71962 | 4/2010 |

OTHER PUBLICATIONS

Office Action issued Jul. 14, 2015 in Japanese Patent Application No. 2012-034577 (with English translation).

* cited by examiner

*Primary Examiner* — Tu Nguyen
(74) *Attorney, Agent, or Firm* — Oblon, McClelland, Maier & Neustadt, L.L.P.

(57) ABSTRACT

A method for controlling an information processing system that includes a client device including a plurality of sensors that acquire positional information of the client device and a server device that transmits data to the client device includes causing the server device to specify a positioning requirement corresponding to positional information of the client device based on association information associating a distance between the client device and a location in which the server device transmits the data to the client device located with each of the sensors, and causing the client device to select a sensor based on the positioning requirement specified by the server device among the sensors.

9 Claims, 22 Drawing Sheets

| SERVICE ID (412) | SERVICE TARGET POSITIONAL INFORMATION (414) |
|---|---|
| 1000 | (X1,Y1),(X2,Y2),(X3,Y3),(X4,Y4) |
|  |  |
| 1001 |  |

| SENSOR TO BE USED (454) | STATE OF POWER SUPPLY (464) | USAGE SERVICE ID (421) | PREVIOUS POSITIONING INFORMATION (468) |
|---|---|---|---|
| 3G (BASE STATION) | ON | - | COORDINATES, ACCURACY, ACQUISITION TIME, POSITIONING TIME |
| WIRELESS LAN | OFF | - | |
| GPS/IMES | ON | 0100,0101 | |

| POSITIONING ACCURACY 472 | CURRENT SENSOR INFORMATION 474 | CONSUMPTION POWER 476 |
|---|---|---|
| LOW | 3G | LOW |
| MIDDLE | WIRELESS LAN | MIDDLE |
| HIGH | GPS/IMES | HIGH |

⇧

470

| POSITIONING ACCURACY 472 | CURRENT SENSOR INFORMATION 474 | CONSUMPTION POWER 476 |
|---|---|---|
| LOW | GPS/IMES | HIGH |
| MIDDLE | 3G | LOW |
| HIGH | WIRELESS LAN | MIDDLE |

| DISTANCE (d) | SETTING ACCURACY | SETTING FREQUENCY |
|---|---|---|
| 30km < d | LOW | INTERVAL OF 15 MINUTES |
| 5km < d | LOW | INTERVAL OF 5 MINUTES |
| 500m < d ≦ 5km | MIDDLE | INTERVAL OF 3 MINUTES |
| d ≦ 500m | HIGH | INTERVAL OF 1 MINUTE |

| POSITIONING REQUIREMENT LEVEL (442) | SETTING ACCURACY (434) | SETTING FREQUENCY (436) |
|---|---|---|
| 1 | LOW | INTERVAL OF 15 MINUTES |
| 2 | LOW | INTERVAL OF 5 MINUTES |
| 3 | MIDDLE | INTERVAL OF 3 MINUTES |
| 4 | HIGH | INTERVAL OF 1 MINUTE |

FIG. 15

| SENSOR TO BE USED (454) | STATE OF POWER SUPPLY (464) | USAGE SERVICE ID (421) | PREVIOUS POSITIONING INFORMATION (468) |
|---|---|---|---|
| 3G (BASE STATION) | ON | — | COORDINATES, ACCURACY, ACQUISITION TIME, POSITIONING TIME |
| WIRELESS LAN | OFF | — | COORDINATES, ACCURACY, ACQUISITION TIME, POSITIONING TIME |
| GPS/IMES | ON | 0100, 0101 | COORDINATES, ACCURACY, ACQUISITION TIME, POSITIONING TIME (T1) |

IT IS ASSUMED TERMINAL IS INDOORS

CASE WHERE RELATIONSHIPS BETWEEN ACCURACIES AND SENSORS ARE FIXED

SENSOR ACCURACY MANAGEMENT DB

| SERVICE ID : 0001<br>POSITIONING ACCURACY :<br>HIGH, FREQUENCY : INTERVAL<br>OF 1 MINUTE | POSITIONAL INFORMATION IS ACQUIRED USING GPS EVEN WHEN TERMINAL IS INDOORS |

| SERVICE ID : 0002<br>POSITIONING ACCURACY :<br>HIGH, FREQUENCY : INTERVAL<br>OF 10 MINUTE | POSITIONAL INFORMATION IS ACQUIRED USING 3G |

| SERVICE ID : 0003<br>POSITIONING ACCURACY :<br>HIGH, FREQUENCY : INTERVAL<br>OF 3 MINUTE | | POSITIONAL INFORMATION IS ACQUIRED USING WIRELESS LAN |

METHOD FOR CONTROLLING INFORMATION PROCESSING SYSTEM, SERVER DEVICE, AND CLIENT DEVICE

CROSS-REFERENCE TO RELATED APPLICATION

This application is based upon and claims the benefit of priority of the prior Japanese Patent Application No. 2012-034577, filed on Feb. 20, 2012, the entire contents of which are incorporated herein by reference.

FIELD

The embodiments discussed herein are related to a method for controlling an information processing system, a server device and a client device.

BACKGROUND

In recent years, the number of mobile terminals that include various sensors is increasing. The mobile terminals can use the sensors to sense behaviors of users. The number of services using positional information as sensing information is increasing. For example, there is the following service. That is, the current position of a user is measured by a global positioning system (GPS) installed in a smart phone, a wireless local area network (LAN) or the like. When the user approaches a location (store, station or the like) specified by a service provider, a center server distributes, to a mobile terminal of the user, an application and coupon that can be used at the location. In the service, an application installed in the mobile terminal periodically acquires information of the current position of the mobile terminal from the GPS or the like and transmits the acquired positional information to the center server. The center server determines, on the basis of the received positional information, whether or not the user has entered in a range in which the service is provided. If the user is in the range, the center server distributes an application and recommended information.

For mobile terminals, there are multiple positioning methods such as autonomous navigation using a GPS, a wireless LAN, a public mobile phone line, an acceleration sensor and a geomagnetic sensor in order to acquire information of the positions of users. The amounts of power to be consumed by the mobile terminals and the accuracies of the positioning methods vary. In general, when a high-accuracy positioning method is used by a mobile terminal, the amount of power to be consumed by the mobile terminal is large. An application that uses positional information and is executed on a mobile terminal does not detect a range in which a service registered in the mobile terminal is provided. Thus, positional information is acquired using a high-accuracy positioning method at short time intervals and is continuously transmitted to the center server. When positioning is repeated with a high accuracy at short time intervals and positional information is transmitted to the center server, the center server can acquire detailed data of the position of a user. The mobile terminal, however, repeats positioning for a short time and consumes power. When an application of the mobile terminal executes positioning with a low accuracy, and the user is close to the range in which the service is provided, the mobile terminal is detected to be far from the range in which the service is provided. In this case, an application and recommended information may not be distributed. Even when the user is far from the range in which the service is provided, and positioning continues to be executed with a high accuracy, the mobile terminal consumes power.

Public mobile phone lines enable mobile terminals to perform communication upon subscriptions to the mobile terminals. Normally, the public mobile phone lines enable the mobile terminals to perform communication in order to receive calls and mails. A service for positioning mobile terminals through the public mobile phone lines is provided. Although the accuracy of the positioning is low, the amount of power to be consumed is small. If the positioning is to be executed with a high accuracy, the positioning is executed using a wireless LAN or a GPS and power is consumed in order to newly drive the sensor.

The following is a related-art document.
Japanese Laid-open Patent Publication No. 2006-115415 is an example of related art.

SUMMARY

According to an aspect of the invention, a method for controlling an information processing system that includes a client device including a plurality of sensors that acquire positional information of the client device and a server device that transmits data to the client device includes causing the server device to specify a positioning requirement corresponding to positional information of the client device based on association information associating a distance between the client device and a location in which the server device transmits the data to the client device located with each of the sensors, and causing the client device to select a sensor based on the positioning requirement specified by the server device among the sensors.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating a service ID table;

FIG. 8 is a first diagram illustrating sensor usage information;

FIG. 9 is a diagram illustrating sensor accuracy management information;

FIG. 11 is a first diagram illustrating a positioning requirement determination table;

FIG. 12 is a second diagram illustrating a positioning requirement determination table;

FIG. 15 is a second diagram illustrating sensor usage information;

FIG. 21 is a second diagram describing effects of the embodiment; and

DESCRIPTION OF EMBODIMENTS

First Embodiment

Hereinafter, an information processing device according to the first embodiment is described.

Figure 1:
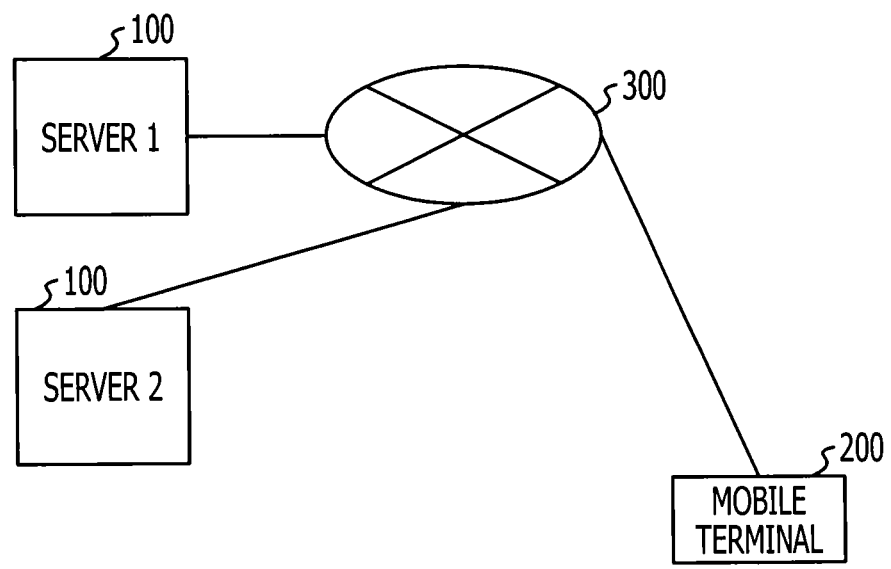
FIG. 1 is a first diagram illustrating an information processing system.

FIG. 1 is a diagram illustrating the information processing system according to the first embodiment. The information processing system includes a plurality of servers 100, a network 300 and a mobile terminal 200. The plurality of servers 100 and the mobile terminal 200 are connected to each other through the network 300.

Figure 2:
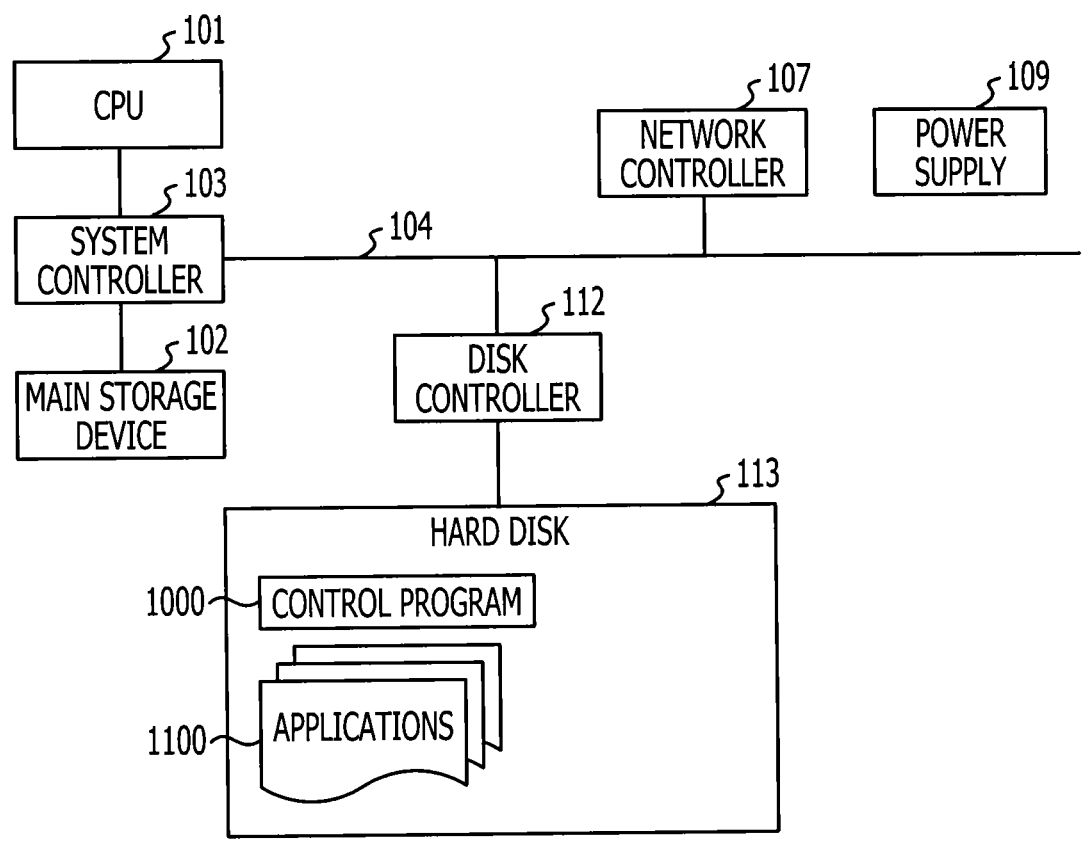
FIG. 2 is a diagram illustrating a hardware configuration of a server.

FIG. 2 is a diagram illustrating a hardware configuration of each of the servers 100 according to the present embodiment. The servers 100 each include a central processing unit (CPU) 101, a main storage device 102, a system controller 103, a bus 104, a network controller 107, a power supply 109, a disk controller 112 and a hard disk 113. The servers 100 are controlled by the CPUs 101.

The CPU 101 and the main storage device 102 are connected to the system controller 103. The system controller 103 controls transmission of data between the CPU 101 and the main storage device 102 and transmission of data between the CPU 101 and the bus 104. The system controller 103 is connected to the network controller 107 and the disk controller 112 through the bus 104.

At least a part of an OS program and an application program is temporarily stored in the main storage device 102. The OS program and the application program are executed by the CPU 101. Data of various types that is used for a process to be executed by the CPU 101 is stored in the main storage device 102. A random access memory (RAM) is used as the main storage device 102, for example.

The disk controller 112 is connected to the hard disk 113 and controls the hard disk 113. The hard disk 113 stores application programs 1100 and a control program 1000. The CPU 101 executes the application programs 1100 on the main storage device 102. The control program 1000 causes the CPU 101 to control calling of the application programs 1100 and the like. The hard disk 113 stores service target positional information, positional information of a user and the like, which are described later.

The network controller 107 is connected to the mobile terminal 200 through the network 300 illustrated in FIG. 1 and transmits and receives data of various types to and from the mobile terminal 200. The power supply 109 supplies power to each of the hardware parts included in the server 100 through power supply lines (not illustrated). Processing functions of the server 100 can be achieved by the aforementioned hardware.

Figure 3:
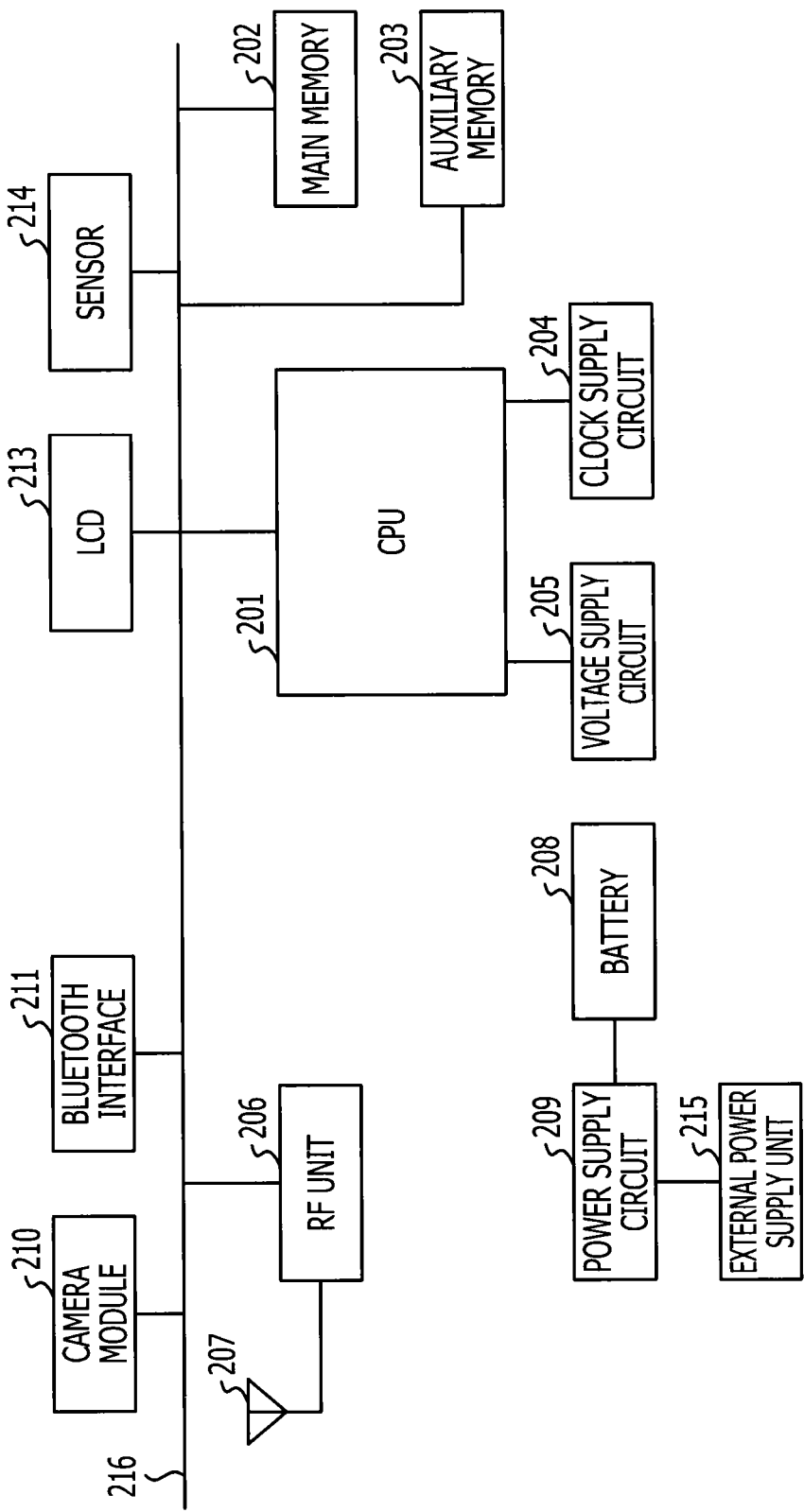
FIG. 3 is a diagram illustrating a hardware configuration of a mobile terminal.

FIG. 3 is a diagram illustrating a hardware configuration of the mobile terminal 200 according to the present embodiment. The mobile terminal 200 illustrated in FIG. 3 is a smart phone, a tablet personal computer (PC) or the like, for example.

The mobile terminal 200 includes a central processing unit (CPU) 201, a main memory 202, an auxiliary memory 203, a clock supply circuit 204, a voltage supply circuit 205, a radio frequency (RF) unit 206, an antenna 207 and a battery 208 as hardware modules. In addition, the mobile terminal 200 includes a power supply circuit 209, a camera module 210, a Bluetooth interface 211, a liquid crystal display (LCD) 213, sensors 214 and an external power supply unit 215 as hardware modules. The hardware modules are connected to each other through a bus 216.

The CPU 201 controls the whole mobile terminal 200. The CPU 201 operates on the basis of a clock signal supplied from the clock supply circuit 204 and a voltage supplied from the power supply circuit 205. The CPU 201 completely stops operating if a software process is not executed. The CPU 201 is in a sleep state until an interrupt is provided from outside the mobile terminal 200. Thus, the CPU 201 reduces power to be consumed. The CPU 201 may be a quad-core CPU or include an arbitrary number of cores.

The main memory 202 is a RAM, for example. The main memory 202 is used as a work area of the CPU 201. The auxiliary memory 203 is a hard disk or a nonvolatile memory such as a flash memory, for example. The auxiliary memory 203 stores various programs to be used to operate the mobile terminal 200. The programs stored in the auxiliary memory 203 are loaded into the main memory 202 and executed by the CPU 201. By causing the CPU 201 to execute the programs, various programs (described later) are executed in the mobile terminal 200.

The clock supply circuit 204 supplies a frequency-variable clock signal to the CPU 201. The clock supply circuit 204 can be achieved by a crystal oscillator for oscillating the clock signal or a real time clock (RTC), for example. The voltage supply circuit 205 uses power supplied form the power supply circuit 209 and thereby supplies a variable voltage to the CPU 201. The voltage supply circuit 205 can be achieved by a voltage detector and a voltage regulator, or the like.

The RF unit 206 has a function of transmitting a high-frequency signal from the antenna 207 to another wireless communication device. The RF unit 206 is controlled by the CPU 201 and thereby transmits the high-frequency signal. The RF unit 206 has a function of converting a high-frequency signal received by the antenna 207 into a baseband signal and outputting the baseband signal to the CPU 201.

The battery 208 supplies power to the power supply circuit 209. The battery 208 can be achieved by a battery such as a lithium ion battery and an integrated circuit (IC) for protecting the battery, or the like. The power supply circuit 209 supplies the power supplied from the battery 208 to the hardware modules of the mobile terminal 200 through a power supply line (not illustrated). When the external power supply unit 215 is connected to an external power supply, the power supply circuit 209 may supply power supplied from the external power supply unit 215 to the hardware modules of the mobile terminal 200. The power supply circuit 209 can be achieved by a switching regulator and a voltage regulator, or the like.

The camera module 210 is controlled by the CPU 201, thereby images an object and acquires video image data obtained by imaging the object. The Bluetooth interface 211 is a communication interface that is controlled by the CPU 201 and thereby uses Bluetooth (registered trademark) to perform wireless communication with another communication device. The mobile terminal 200 may include the Bluetooth interface 211 and a wireless communication interface such as a local area network (LAN) interface.

The LCD 213 is an image display device that is controlled by the CPU 201 and thereby displays an image for a user. The LCD 213 may be a touch panel that has a touch pad with a function of receiving positional information.

The sensors 214 are controlled by the CPU 201 and thereby acquire information indicating each of states of internal parts of the mobile terminal 200. Examples of the sensors 214 are an acceleration sensor, a gyrosensor, an illuminance sensor, a geomagnetic sensor, an inclination sensor, a pressure sensor, a proximity sensor, a temperature sensor, 3G, a wireless LAN and a GPS module. The GPS module is controlled by the CPU 201, thereby receives a radio wave emitted by a satellite and acquires positional information indicating the current position of the mobile terminal 200 on the earth.

Figure 4:
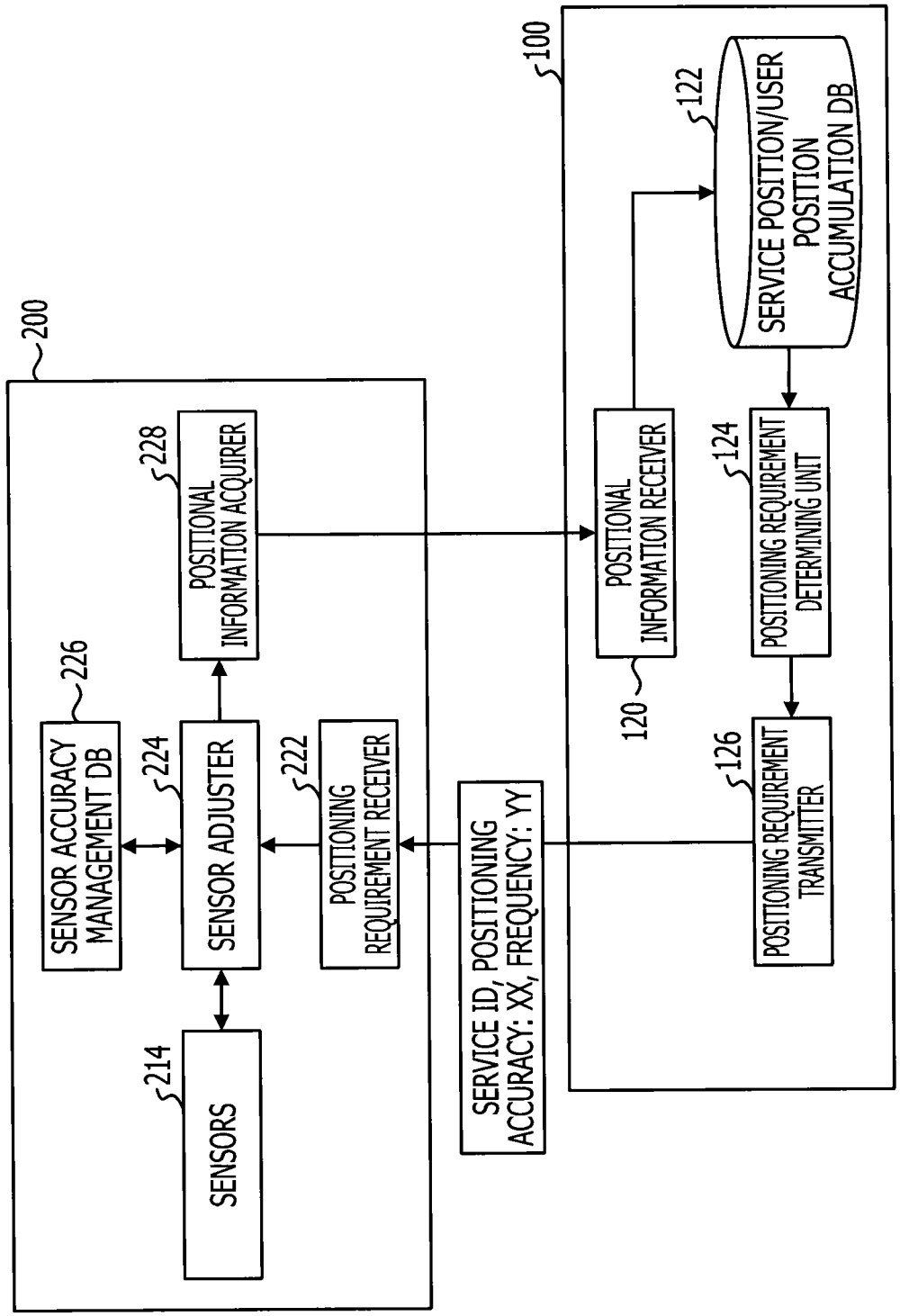
FIG. 4 is a second diagram illustrating the information processing system.

FIG. 4 is a diagram illustrating the information processing system according to the present embodiment. The information processing system includes the server 100 and the mobile terminal 200. Functions (described later) of the server 100 are achieved by causing the CPU 101 of the server 100 to execute various programs, while functions (described later) of the mobile terminal 200 are achieved by causing the CPU 201 of the mobile terminal 200 to execute various programs.

The server 100 includes a positional information receiver 120, a service position/user position accumulation database (DB) 122, a positioning requirement determining unit 124 and a positioning requirement transmitter 126. The positional information receiver 120 acquires positional information of the mobile terminal 200 from the mobile terminal 200. The positional information receiver 120 causes the positional information acquired from the mobile terminal 200 and indicating the position of the mobile terminal 200 to be stored in the service position/user position accumulation DB 122.

The service position/user position accumulation DB 122 stores a service ID and information of a location (a station, a store or the like) at which a service is provided. The service ID is identification information that is used in order for a service provider to identify the service.

FIG. 5 is a diagram illustrating a service ID table 410. The service ID table 410 is stored in the service position/user position accumulation DB 122. The service ID table 410 includes items for a service ID 412 and service target positional information 414. The service ID 412 is information that identifies a service that is provided by the server 100 to the mobile terminal 200. The service target positional information 414 is information of the position of the mobile terminal 200 to which the service corresponding to the service ID 412 is provided.

Figure 6:
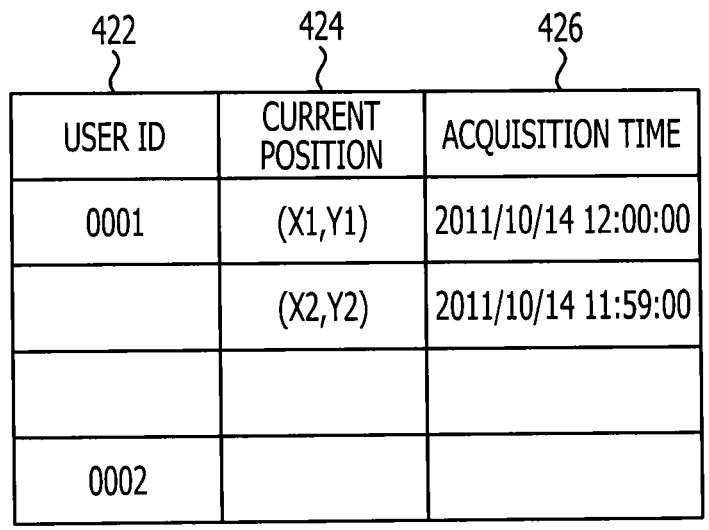
FIG. 6 is a diagram illustrating a user ID table.

FIG. 6 is a diagram illustrating a user ID table 420. The user ID table 420 is stored in the service position/user position accumulation DB 122. The user ID table 420 includes items for a user ID 422, a current position 424 and an acquisition time 426. The user ID 422 is information that identifies a user to which the server 100 provides a service. The current position 424 indicates the current position of the mobile terminal 200. The acquisition time 426 indicates a time when the server 100 acquires information of the current position of the corresponding user.

The positioning requirement determining unit 124 determines, on the basis of the positional information received from the mobile terminal 200, positioning requirements that include a frequency at which positional information of the mobile terminal 200 is next acquired and the accuracy of the positional information of the mobile terminal 200. The positioning requirement determining unit 124 transmits the positioning requirements to the positioning requirement transmitter 126. It is assumed that the transmitted positioning requirements indicate "a service ID, positioning, the accuracy: low and the frequency: only once", for example.

The positioning requirement transmitter 126 transmits the positioning requirements received from the positioning requirement determining unit 124 to the mobile terminal 200.

The mobile terminal 200 includes a positioning requirement receiver 222, a sensor adjuster 224, a sensor accuracy management DB 226, the sensors 214 and a positional information acquirer 228.

The positioning requirement receiver 222 receives the positioning requirements from the positioning requirement transmitter 126 of the server 100. The positioning requirement receiver 222 transmits the received positioning requirements to the sensor adjuster 224.

The sensor adjuster 224 references the received positioning requirements. When the sensor adjuster 224 detects that the accuracy is not "high" and the frequency is set to "only once", the sensor adjuster 224 causes the mobile terminal 200 to execute positioning using a sensor 214 that is indicated in setting information 450 stored in the sensor accuracy management DB 226 and acquires positional information for a short acquisition time period indicated in the setting information 450.

Figure 7:
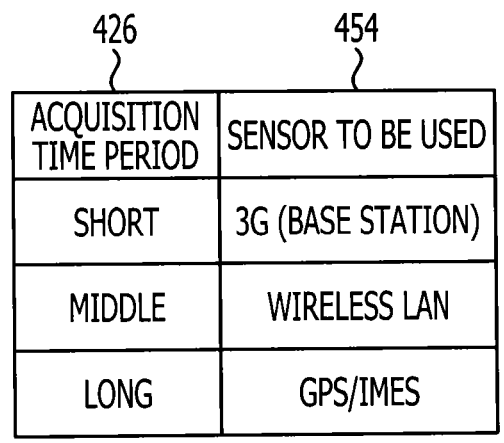
FIG. 7 is a diagram illustrating setting information.

FIG. 7 is a diagram illustrating the setting information 450. The setting information 450 is stored in the sensor accuracy management DB 226. The setting information 450 includes items for acquisition time periods 426 and information of sensors 454 to be used. The acquisition time periods 426 indicate time periods for acquisition of positional information. The information of the sensors 454 to be used indicates the names of sensors 214 to be used.

In general, if it takes a long time to acquire positional information in positioning, the amount of power to be consumed is large. When the frequency is set to "only once", it is sufficient if an approximate position is acquired, and the position can be acquired for a short time. Thus, it is efficient to set the frequency to "only once". Especially, when a base station is used for the positioning, the positioning is executed using a public mobile phone line that is in a communication state. In this case, although the accuracy of the positioning is low, the positioning can be executed for approximately 10 seconds without turning on a power supply for a new device.

Power to be consumed by the sensors 214 is described below. In GPS positioning, the mobile phone 200 captures signals from, for example, four GPS satellites and uses the signals to detect the position of the mobile terminal 200. The mobile terminal 200 calculates distances between the mobile terminal 200 and the GPS satellites on the basis of time periods in which the signals propagate from the GPS satellites to the mobile terminal 200. The mobile terminal 200 treats, as the position of the mobile terminal 200, a point at which four spherical surfaces intersect with each other. The mobile terminal 200 receives orbit data (almanac data) of all the GPS satellites and satellite orbit data (ephemeris data). The two types of data is 50 bps and transmitted from the GPS satellites to the mobile terminal 200 at intervals of 30 seconds.

It takes 30 seconds or more for the mobile terminal 200 to receive new ephemeris data from the GPS satellites. The mobile terminal 200 searches satellite signals transmitted from GPS satellites and specifies the GPS satellites located above the mobile terminal 200. Then, the mobile terminal 200 receives the almanac data from the GPS satellites, detects orbits of all the GPS satellites, searches another satellite, and receives ephemeris data. The received ephemeris data has an expiration date. After the expiration date, the mobile terminal 200 receives ephemeris data again.

As described above, the mobile terminal 200 captures signals from the GPS satellites, acquires data from the GPS satellites, and executes positioning using time information. Thus, it takes some time to execute the positioning, and the mobile terminal 200 consumes power corresponding to the time period for the positioning.

In the base station positioning, the mobile terminal 200 uses positional information (latitude and longitude) of the base station to detect the position of the mobile terminal 200. Since the notified information is the information of the base station, the accuracy of the base station positioning is low. It is, however, sufficient if the mobile terminal 200 uses 3G that is used for calls and communication. 3G provides a function of accessing the server 100 and thereby acquiring the position of the mobile terminal 200.

The base station positioning enables the position of the mobile terminal 200 to be detected for a short time (several seconds) even when the mobile terminal 200 is indoors or located in a basement or the like. A new sensor is not used for the base station positioning. The base station positioning can be achieved only with power that is used for temporal communication.

For the GPS positioning, the GPS sensor (GPS module) is operated. The base station positioning can be achieved using a 3G line that is normally in an ON state. Regarding calculations, the latitude and the longitude are calculated from time information in the GPS positioning. The latitude and the longitude can be acquired in the base station positioning. Regarding operating times, in the GPS positioning, the mobile terminal 200 continuously operates for one minute or more from a state in which the mobile terminal 200 does not have satellite orbit data. In the base station positioning, the mobile terminal 200 operates for several seconds. Thus, in the GPS positioning that causes the mobile terminal 200 to operate for one minute or more, the amount of power to be consumed by the mobile terminal 200 is large.

If the positioning requirements received by the sensor adjuster 224 indicate that "a service ID, positioning, the accuracy: middle, and the frequency: an interval of 3 minutes", an accuracy that is higher than the middle accuracy or a power-on state of the GPS (GPS module) is confirmed. If the GPS is in an ON state due to a request provided for another service, it is wasteful to turn on a wireless LAN of which a positioning accuracy is lower than the GPS. Thus, the positioning is executed by the GPS. If a sensor 214 of which a positioning accuracy is higher than an accuracy indicated in the received positioning requirements and that is in an ON state due to a request provided for another service does not exist, a sensor 214 that matches the accuracy indicated in the received positioning requirements is selected and turned on. Then, the positioning is executed by the selected sensor 214. Before the positioning is executed, the service ID included in the received positioning requirements is described in an item for usage service IDs 421 in sensor usage information 460. The mobile terminal 200 transmits the positional information received by executing the positioning to a center server and deletes the service ID from the item for usage service IDs in the sensor usage information 460. After that, the sensor 214 is turned off on the basis of the frequency described in the positioning requirements until the positioning is next executed. Before the sensor 214 is turned off, the mobile terminal 200 confirms that a service that uses the sensor 214 used is not provided or any service ID does not exist in the item for usage service IDs in the sensor usage information 460.

FIG. 8 is a diagram illustrating the sensor usage information 460. The sensor usage information 460 is stored in the sensor accuracy management DB 226. The sensor usage information 460 includes information of the sensors 454 to be used, power supply states 464, usage service IDs 421 and previous positioning information 468. The information of the sensors 454 to be used indicates the sensors 214 to be used. The power supply states 464 indicate that power supplies of the corresponding sensors 214 are in ON or OFF states. The usage service IDs 421 indicate IDs to be used by a user. The previous positioning information 468 indicates coordinates, an accuracy, an acquisition time and a positioning time, which are obtained when the positioning is executed using a corresponding sensor 214.

The sensor adjuster 224 references the sensor accuracy management DB 226, selects a sensor 214 to be operated from among the plurality of sensors 214 on the basis of the positioning requirements received from the positioning requirement receiver 222, and switches on or off the selected sensor 214.

FIG. 9 is a diagram illustrating sensor accuracy management information 470. The sensor accuracy management information 470 is stored in the sensor accuracy management DB 226. The sensor accuracy management information 470 includes items for positioning accuracies 472, current sensor information 474 and consumption power 476. The positioning accuracies 472 indicate the accuracies of the positioning to be executed by the corresponding sensors 214. The current sensor information 474 indicates the types of the current sensors 214. The consumption power 476 indicates power to be consumed by the corresponding sensors 214. The sensor accuracy management information 470 is updated on the basis of the positioning accuracies as illustrated in FIG. 9. The update of the sensor accuracy management information 470 is described later.

Relationships between the sensors 214 and power to be consumed by the sensors 214 are described below. In order to detect the position of the mobile terminal 200, signals are captured from GPS satellites (for example, four GPS satellites) by the mobile terminal 200 and used by the mobile terminal 200 in the GPS positioning. The mobile terminal 200 calculates distances between the mobile terminal 200 and the GPS satellites on the basis of time periods in which the signals propagate from the GPS satellites to the mobile terminal 200. The mobile terminal 200 treats, as the position of the mobile terminal 200, a point at which four spherical surfaces intersect with each other. The mobile terminal 200 receives orbit data (almanac data) of all the GPS satellites and satellite orbit data (ephemeris data). The two types of data is 50 bps and transmitted from the GPS satellites to the mobile terminal 200 at intervals of 30 seconds.

It takes 30 seconds or more for the mobile terminal 200 to receive new ephemeris data from the GPS satellites. The mobile terminal 200 searches satellite signals transmitted from GPS satellites and specifies the GPS satellites located above the mobile terminal 200. Then, the mobile terminal 200 receives the almanac data from the GPS satellites, detects orbits of all the GPS satellites, searches another satellite, and receives ephemeris data. The received ephemeris data has an expiration date. After the expiration date, the mobile terminal 200 receives ephemeris data again.

As described above, the mobile terminal 200 captures signals from the GPS satellites, acquires data from the GPS satellites, and executes positioning using time information. It takes some time to execute the positioning, and the mobile terminal 200 consumes power corresponding to the time period for the positioning.

In the base station positioning, the mobile terminal 200 uses positional information (latitude and longitude) of the base station to detect the position of the mobile terminal 200. Since the notified information is the information of the base station, the accuracy is low. It is, however, sufficient if the mobile terminal 200 uses 3G that is used for calls and communication. 3G provides a function of accessing the server 100 and thereby acquiring the position of the mobile terminal 200.

The base station positioning enables the position of the mobile terminal 200 to be acquired for a short time (several seconds) even when the mobile terminal 200 is indoors or located in a basement or the like. A new sensor is not used for the base station positioning. The base station positioning can be achieved only with power that is used for temporal communication.

For the GPS positioning, the GPS sensor is operated. The base station positioning can be achieved by a 3G line that is normally in an ON state. Regarding calculations, the latitude and the longitude are calculated from time information in the GPS positioning. The latitude and the longitude can be acquired in the base station positioning. Regarding operating times, in the GPS positioning, the mobile terminal 200 continuously operates for one minute or more from the state in which the mobile terminal 200 does not have satellite orbit data. In the base station positioning, the mobile terminal 200 operates for several seconds. Thus, in the GPS positioning that causes the mobile terminal 200 to operate for one minute or more, the amount of power to be consumed by the mobile terminal 200 is large.

Figure 10:
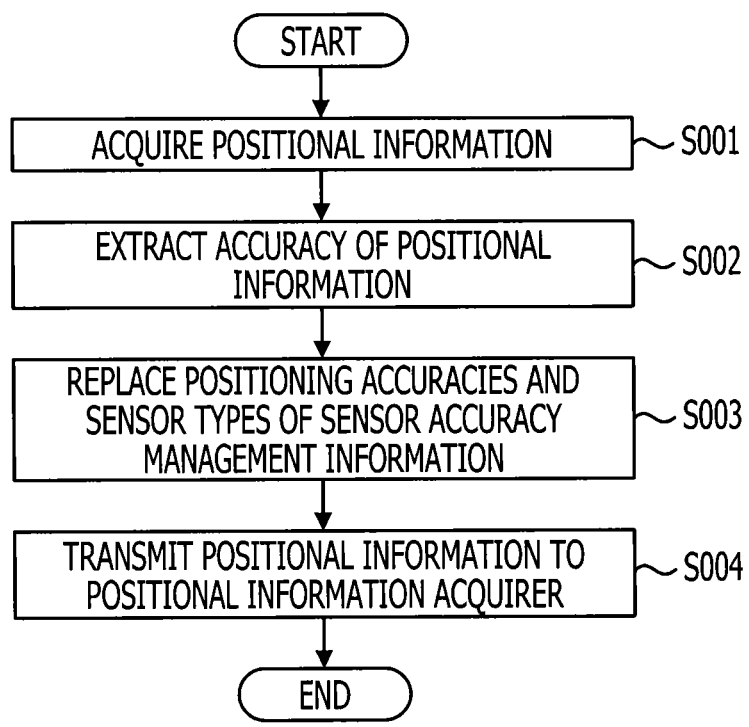
FIG. 10 is a flowchart of a process that is executed by a sensor adjuster.

FIG. 10 is a flowchart of a process that is executed by the sensor adjuster 224.

In S001, the sensor adjuster 224 acquires positional information from any of the sensors 214. The sensor adjuster 224 causes the process to proceed to S002.

In S002, the sensor adjuster 224 extracts an accuracy of the positional information. The sensor adjuster 224 causes the process to proceed to S003.

In S003, the sensor adjuster 224 replaces the positioning accuracies and sensor types of the sensor accuracy management information 470 so as to update the sensor accuracy management information 470. The sensor adjuster 224 causes the process to proceed to S004.

In S004, the sensor adjuster 224 transmits the acquired positional information to the positional information acquirer 226. The sensor adjuster 224 terminates the process.

The positional information transmitted by the mobile terminal 200 is received by the positional information receiver 120 of the server 100 as described above, and is stored in the service position/user position accumulation DB 122 as a user ID, a current position and an acquisition time. The positioning requirement determining unit 124 determines the next position requirements on the basis of the received positional information. For example, the positioning requirement determining unit 124 determines positioning requirements on the basis of a service target position stored in the service position/user position accumulation DB 122 and information indicating the position of a user and stored in the service position/user position accumulation DB 122.

FIG. 11 illustrates a positioning requirement determination table 430. The positioning requirement determination table 430 is stored in the service position/user position accumulation DB 122. The positioning requirement determination table 430 includes items for distances 432, setting accuracies 434 and setting frequencies 436. The distances 432 indicate distances between the mobile terminal 200 and locations at which a service is provided. The setting accuracies 434 indicate the positioning accuracies of the sensors 214 that are used by the mobile terminal 200 to measure the position of the mobile terminal 200. The setting frequencies 436 indicate frequencies at which the mobile terminal 200 measures the position of the mobile terminal 200. The positioning requirement determination table 430 stores the distances 432, the setting accuracies 434 and the setting frequencies 436 while a distance 432, a setting accuracy 434 and a setting frequency 436 that are described in each of rows of the positioning requirement determination table 430 are associated with each other.

The positioning requirement determining unit 124 references the positioning requirement determination table 430 and determines positioning requirements on the basis of the information received from the positional information receiver 120 and indicating the position of the mobile terminal 200. The positioning requirement determining unit 124 sets positioning requirements on the basis of a distance between the received current position (P1) of the mobile terminal and a service target position (P0). When d(x, y) indicates a distance between x and y, the positioning requirement determining unit 124 determines positioning requirements corresponding to a value of d(P1, P0) on the basis of the positioning requirement determination table 430 (illustrated in FIG. 11) in a step-by-step manner.

For example, the positioning requirement determining unit 124 determines positioning requirements on the basis of whether or not the mobile terminal 200 relatively approaches the service target position.

FIG. 12 illustrates a positioning requirement determination table 530. The positioning requirement determination table 530 is stored in the service position/user position accumulation DB 122. The positioning requirement determination table 530 includes items for positioning requirement levels 442, setting accuracies 434 and setting frequencies 436. The positioning requirement levels 442 indicate levels of positioning requirements. The setting accuracies 434 indicate positioning accuracies of the sensors 214 that are used by the mobile terminal 200 to measure the position of the mobile terminal 200. The setting frequencies 436 indicate frequencies at which the mobile terminal 200 measures the position of the mobile terminal 200. The positioning requirement determination table 530 stores the positioning requirement levels 442, the setting accuracies 434 and the setting frequencies 436, while a positioning requirement level 442, a setting accuracy 434 and a setting frequency 436 that are described in each of rows of the positioning requirement determination table 530 are associated with each other.

If a previously acquired position of the mobile terminal 200 is indicated by P2, and d(P2, P0)>d(P1, P0), the positioning requirement determining unit 124 determines positioning requirements on the basis of the positioning requirement determination table 530 (illustrated in FIG. 12) while increasing the positioning requirement level one by one.

Figure 13:
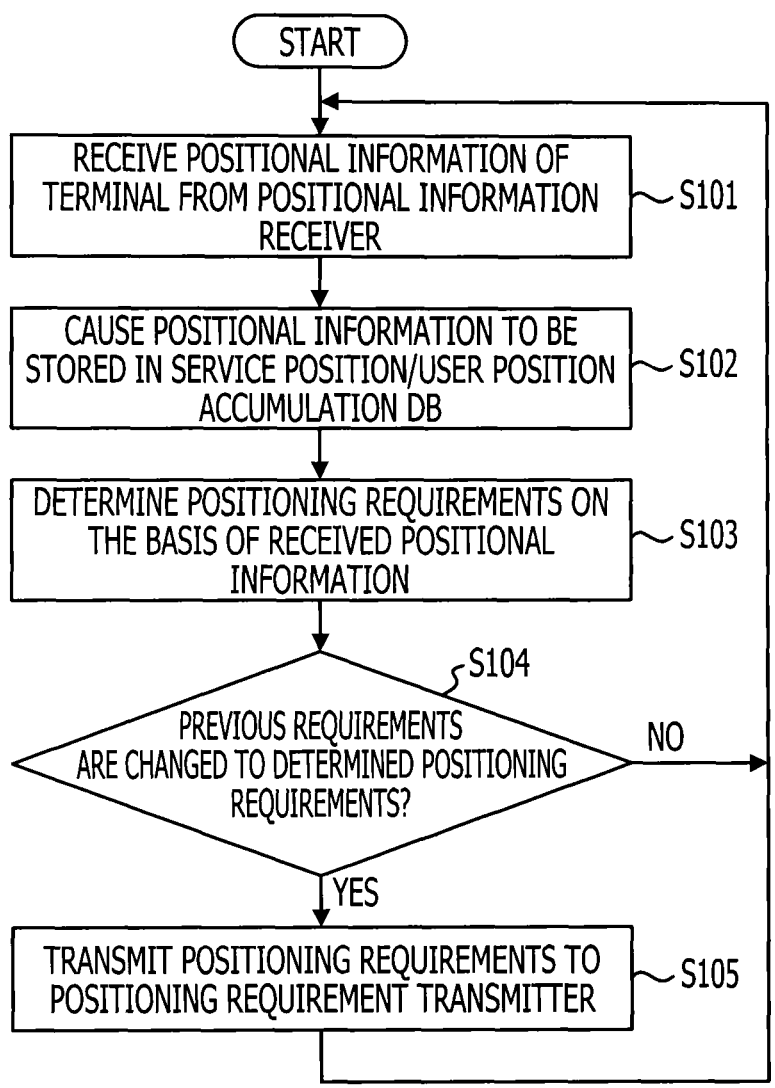
FIG. 13 is a first flowchart of a process that is executed by a positioning requirement determining unit.

FIG. 13 is a flowchart of a process that is executed by the positioning requirement determining unit 124.

In S101, the positioning requirement determining unit 124 receives positional information of the mobile terminal 200 from the positional information receiver 120. The positioning requirement determining unit 124 causes the process to proceed to S102.

In S102, the positioning requirement determining unit 124 causes the positional information, received from the positional information receiver 120, of the mobile terminal 200 to be stored in the service position/user position accumulation DB 122. The positioning requirement determining unit 124 causes the process to proceed to S103.

In S103, the positioning requirement determining unit 124 references the positioning requirement determination table 430 or 530 and determines positioning requirements on the basis of a distance between the position, indicated in the positional information received from the positional information receiver 120, of the mobile terminal 200 and a location at which a service for transmitting data is provided. The positioning requirement determining unit 124 causes the process to proceed to S104.

In S104, the positioning requirement determining unit 124 determines whether or not previous positioning requirements are changed to the determined positioning requirements. If the previous positioning requirements are changed to the determined positioning requirements, the positioning requirement determining unit 124 causes the process to proceed to S105. If the previous positioning requirements are not changed to the determined positioning requirements, the positioning requirement determining unit 124 causes the process to return to S101. If the previous positioning requirements are changed to the determined positioning requirements, the positioning requirement determining unit 124 can transmit the latest transmission requirement to the mobile terminal 200.

In S105, the positioning requirement determining unit 124 transmits the determined positioning requirements to the positioning requirement transmitter 126. The positioning requirement determining unit 124 causes the process to return to S101.

Figure 14:
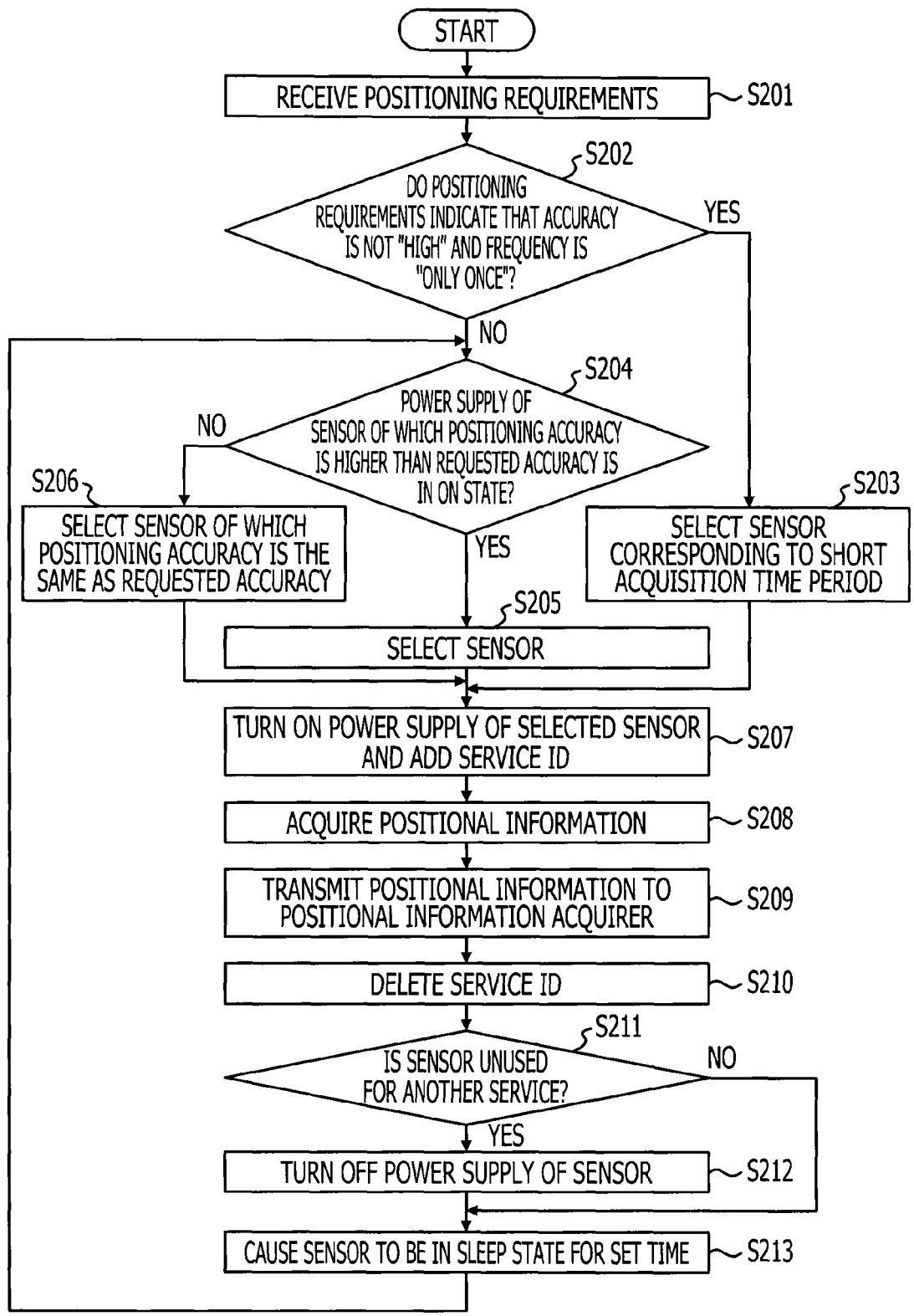
FIG. 14 is a first flowchart of a process that is executed by the sensor adjuster.

FIG. 14 is a flowchart of a process that is executed by the sensor adjuster 224.

In S201, the sensor adjuster 224 receives the positioning requirements. The sensor adjuster 224 causes the process to proceed to S202.

In S202, the sensor adjuster 224 determines whether or not the positioning requirements indicate that "the accuracy is not "high" and the frequency is "only once"". If the positioning requirements indicate that "the accuracy is not "high" and the frequency is "only once"", the sensor adjuster 224 causes the process to proceed to S203. If the positioning requirements do not indicate that "the accuracy is not "high" and the frequency is "only once"", the sensor adjuster 224 causes the process to proceed to S204.

In S203, the sensor adjuster 224 references the setting information 450 and selects a sensor 214 corresponding to a "short acquisition time period". The sensor adjuster 224 causes the process to proceed to S207.

In S204, the sensor adjuster 224 references the positioning requirements and determines whether or not a power supply of a sensor 214 of which a positioning accuracy is higher than the requested accuracy is in an ON state. If the power supply of the sensor 214 of which the positioning accuracy is higher than the requested accuracy is in the ON state, the sensor adjuster 224 causes the process to proceed to S205. If the power supply of the sensor 214 of which the positioning accuracy is higher than the requested accuracy is not in the ON state, the sensor adjuster 224 causes the process to proceed to S206.

In S205, the sensor adjuster 224 selects the sensor 214 of which the positioning accuracy is higher than the requested accuracy and of which the power supply is in the ON state. The sensor adjuster 224 causes the process to proceed to S207.

In S206, the sensor adjuster 224 references the positioning requirements and selects a sensor 214 of which a positioning accuracy is the same as the requested accuracy. The sensor adjuster 224 causes the process to proceed to S207.

In S207, the sensor adjuster 224 turns on the power supply of the selected sensor 214 if the power supply of the selected sensor 214 is not in the ON state, and the sensor adjuster 224 adds a service ID to the sensor usage information 460. The sensor adjuster 224 causes the process to proceed to S208.

In S208, the sensor adjuster 224 acquires positional information from the selected sensor 214. The sensor adjuster 224 causes the process to proceed to S209.

In S209, the sensor adjuster 224 transmits the acquired positional information to the positional information acquirer 228. The sensor adjuster 224 causes the process to proceed to S210.

In S210, the sensor adjuster 224 deletes the service ID from the sensor usage information 460. The sensor adjuster 224 causes the process to proceed to S211.

In S211, the sensor adjuster 224 determines whether or not the sensor 214 is unused for another service. If the sensor 214 is unused for the other service, the sensor adjuster 224 causes the process to proceed to S212. If the sensor 214 is used for the other service, the sensor adjuster 224 causes the process to proceed to S213.

In S212, the sensor adjuster 224 turns off the power supply of the sensor 214. The sensor adjuster 224 causes the process to proceed to S213.

In S213, the sensor adjuster 224 causes the sensor 214 selected on the basis of the positioning requirements to be in a sleep state for a set time. The sensor adjuster 224 causes the process to proceed to S204.

According to the present embodiment, the positioning requirement determining unit 124 of the service 100 determines positioning requirements including a frequency at which positional information of the mobile terminal 200 is next acquired and the accuracy of the positional information of the mobile terminal 200. Then, the positioning requirement determining unit 124 transmits the determined positioning requirements to the positioning requirement transmitter 126. The positioning requirement receiver 222 of the mobile terminal 200 receives the positioning requirements and transmits the positioning requirements to the sensor adjuster 224. The sensor adjuster 224 references the sensor accuracy management DB 226 and selects a sensor 214 matching the positioning accuracy included in the received positioning requirements. The sensor adjuster 224 turns on the sensor 214 of which a positioning accuracy matches the positioning requirements. Then, the sensor adjuster 224 causes the sensor 214 to execute the positioning. The mobile terminal 200 transmits positional information acquired by the positioning to the center server. After that, the sensor adjuster 224 turns off the sensor 214 on the basis of the positioning frequency described in the positioning requirements until the positioning is next executed. The higher the accuracy of the positioning, the larger the amount of power to be consumed. Thus, if the positioning requirement (accuracy) transmitted from the center server is low, a sensor 214 of which a positioning accuracy is low (and that consumes a small amount of power) is used. The sensor 214 that is used by the mobile terminal 200 is changed on the basis of positioning requirements that vary depending on whether or not high-accuracy positional information is to be used. Thus, it is effective to save power to be consumed by the mobile terminal 200.

According to the present embodiment, a frequency at which positional information of the mobile terminal 200 is acquired and the accuracy of the positional information of the mobile terminal 200 are determined on the basis of a distance between the current position of the user and a service target position. Thus, if the user is far from the service target position, the accuracy of the positioning is reduced and the frequency of the positioning is reduced so that an interval between times of the positioning is increased. Thus, the amount of power to be consumed by the mobile terminal 200 can be reduced. On the other hand, if the user approaches the service target position, the accuracy of the positioning is increased and the frequency of the positioning is increased so that an interval between times of the positioning is reduced. Thus, an accurate position of the user can be detected, and whereby the quality of the service is improved. High-accuracy positioning is not executed in some cases. A reduction in the amount of power to be consumed by the mobile terminal 200 can be achieved by temporarily reducing a positioning accuracy to be requested and a frequency of positioning.

Second Embodiment

The sensor accuracy management DB 226 of the mobile terminal 200 according to the second embodiment holds, as the sensor usage information 460, a time period for a certain sensor 214 to acquire the position of the mobile terminal 200. If a sensor 214 does not acquire the position of the mobile terminal 200 within a time period that is equal to a period of time for the sensor 214 to previously acquire the position of the mobile terminal 200, the mobile terminal 200 determines not to receive a sufficient radio wave, sets a positioning accuracy of the sensor executing the positioning to "low", and relatively increases positioning accuracies of the other sensors 214.

FIG. 15 illustrates sensor usage information 480 according to the present embodiment. The sensor usage information 480 includes items for information of sensors 454 to be used, states 464 of power supplies, service IDs 421 and previous positioning information 468. The previous positioning information 468 includes positioning time periods that are periods of times to acquire the position of the mobile terminal 200 in the positioning.

For example, as illustrated in FIG. 9, the sensor accuracy management information 470 that indicates that the positioning accuracy of the public mobile phone line<the positioning accuracy of the wireless LAN<the positioning accuracy of the GPS/IMES is updated to the sensor accuracy management information 470 that indicates that the positioning accuracy of the GPS/IMES<the positioning accuracy of the public mobile phone line<the positioning accuracy of the wireless LAN. This assumes that the user enters in a building or the like, the mobile terminal 200 does not receive a signal with a sufficient intensity from a GPS satellite, and the positioning accuracy of the GPS/IMES actually becomes lower than the positioning accuracy of the public mobile phone line. The GPS positioning is not limited to the case where the user is indoors. When the GPS positioning is used and the user enters in a shadow of a building or the like, the number of GPS satellites that transmit signals that can be received by the mobile terminal 200 may be reduced and the positioning accuracy may be reduced. Thus, it is possible to avoid using a sensor 214 that does not ensure a high accuracy (or consumes a large amount of power).

The positioning using the public mobile phone line can be achieved regardless of whether the user stays indoors or outdoors. Thus, a problem that if the positioning accuracy of the GPS/IMES is set to "low", the positioning accuracy GPS/IMES is not changed from "low" occurs. To avoid this problem, a positioning time is described in the sensor usage information 460. The sensor adjuster 224 receives positioning requirements before selecting a sensor 214 to be operated from among the plurality of sensors 214. If a time threshold elapses after the positioning time, the positioning is executed in accordance with a default setting (for example, the positioning accuracy of the public mobile phone line<the positioning accuracy of the wireless LAN<the positioning accuracy of the GPS/IMES). The sensor adjuster 224 confirms the current validity of the sensor accuracy management DB 226 on the basis of a positioning accuracy included in received positional information. If the sensor adjuster 224 acquires the positional information that indicates a higher positioning accuracy than the low positioning accuracy, the sensor adjuster 224 replaces the positioning accuracies so as to update the sensor accuracy management information 470.

Figure 16:
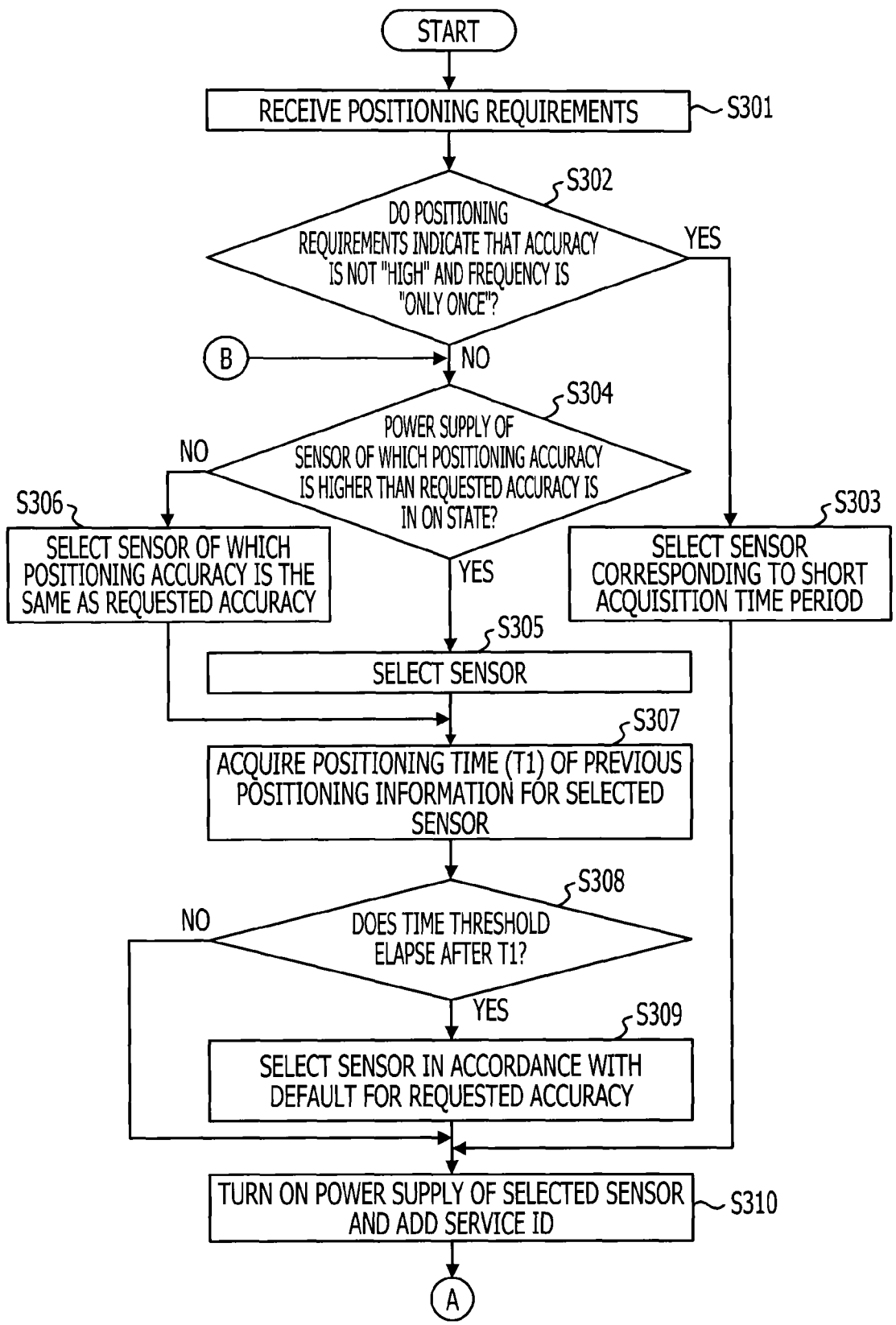
FIG. 16 is a second flowchart of a process that is executed by the sensor adjuster.
Figure 17:
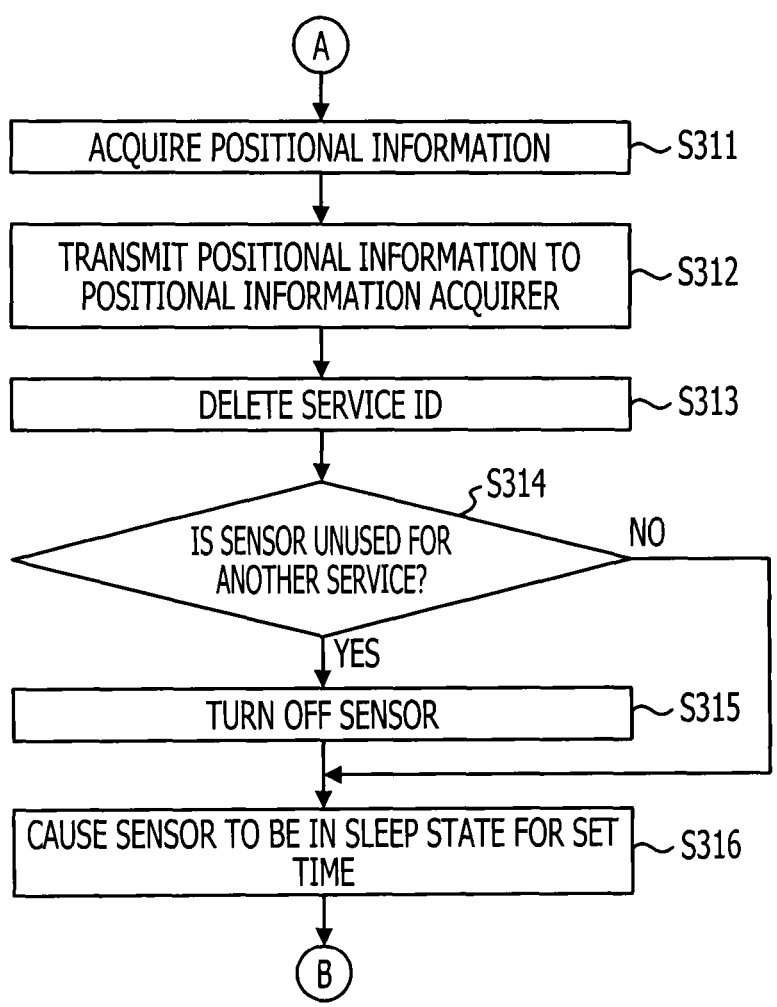
FIG. 17 is a third flowchart of the process that is executed by the sensor adjuster.

FIGS. 16 and 17 are flowcharts of a process that is executed by the sensor adjuster 224.

In S301, the sensor adjuster 224 acquires positioning requirements. The sensor adjuster 224 causes the process to proceed to S302.

In S302, the sensor adjuster 224 determines whether or not the positioning requirements indicate that "the accuracy is not "high" and the frequency is "only once"". If the positioning requirements indicate that "the accuracy is not "high" and the frequency is "only once"", the sensor adjuster 224 causes the process to proceed to S303. If the positioning requirements do not indicate that "the accuracy is not "high" and the frequency is "only once"", the sensor adjuster 224 causes the process to proceed to S304.

In S303, the sensor adjuster 224 references the setting information 450 and selects a sensor 214 corresponding to a "short acquisition time period". The sensor adjuster 224 causes the process to proceed to S310.

In S304, the sensor adjuster 224 references the positioning requirements and determines whether or not a power supply of a sensor 214 of which a positioning accuracy is higher than a requested accuracy is in the ON state. If the power supply of the sensor 214 of which the positioning accuracy is higher than the requested accuracy is in the ON state, the sensor adjuster 224 causes the process to proceed to S305. If the power supply of the sensor 214 of which the positioning accuracy is higher than the requested accuracy is not in the ON state, the sensor adjuster 224 causes the process to proceed to S306.

In S305, the sensor adjuster 224 selects the sensor 214 of which the power supply is in the ON state and of which the positioning accuracy is higher than the requested accuracy. The sensor adjuster 224 causes the process to proceed to S307.

In S306, the sensor adjuster 224 references the positioning requirements and selects a sensor 214 of which a positioning accuracy is the same as the requested accuracy. The sensor adjuster 224 causes the process to proceed to S307.

In S307, the sensor adjuster 224 acquires, from the sensor usage information 480, a positioning time (T1) of the previous positioning information for the selected sensor 214. The sensor adjuster 224 causes the process to proceed to S308.

In S308, the sensor adjuster 224 determines whether or not a time threshold elapses after the positioning time T1. If the time threshold elapses after the positioning time T1, the sensor adjuster 224 causes the process to proceed to S309. If the time threshold does not elapse after the positioning time T1, the sensor adjuster 224 causes the process to proceed to S310.

In S309, the sensor adjuster 224 selects a sensor 214 in accordance with the default for the requested accuracy. The sensor adjuster 224 causes the process to proceed to S310.

In S310, if the power supply of the selected sensor 214 is not in the ON state, the sensor adjuster 224 turns on the power supply of the selected sensor 214 and adds a service ID to the sensor usage information 480. The sensor adjuster 224 causes the process to proceed to S311 illustrated in FIG. 17.

In S311, the sensor adjuster 224 acquires positional information from the sensor 214. The sensor adjuster 224 causes the process to proceed to S312.

In S312, the sensor adjuster 224 transmits the acquired positional information to the positional information acquirer 228. The sensor adjuster 224 causes the process to proceed to S313.

In S313, the sensor adjuster 224 deletes the service ID from the sensor usage information 480. The sensor adjuster 224 causes the process to proceed to S314.

In S314, the sensor adjuster 224 determines whether or not the sensor 214 is unused for another service. If the sensor 214 is unused for the other service, the sensor adjuster 224 causes the process to proceed to S315. If the sensor 214 is used for the other service, the sensor adjuster 224 causes the process to proceed to S316.

In S315, the sensor adjuster 224 turns off the power supply of the sensor 214. The sensor adjuster 224 causes the process to proceed to S316.

In S316, the sensor adjuster 224 causes the selected sensor 214 to be in a sleep state for a set time. The sensor adjuster 224 causes the process to return to S304 illustrated in FIG. 16.

According to the present embodiment, the sensor usage information 480 holds a period of time to acquire the position of the mobile terminal 200 in the positioning. If a sensor 214 does not acquire the position of the mobile terminal 200 within a time period that is equal to a time period for the sensor 214 to previously acquire the position of the mobile terminal 200, the mobile terminal 200 determines not to receive a sufficient radio wave, sets a positioning accuracy of a sensor 214 executing the positioning to "low", and relatively increases positioning accuracies of the other sensors 214. For example, if the positioning accuracy of the GPS is set to "high", the information processing system normally operates, and the user enters in a building or the like, the mobile terminal 200 may not receive a signal with a sufficient intensity from a GPS satellite, and the accuracy of the GPS positioning may become lower than the accuracy of the base station positioning. The mobile terminal 200 can accurately respond to an accuracy request transmitted from the server 100. In addition, the information processing system can inhibit the mobile terminal 200 from executing positioning and thereby continuously acquiring low-accuracy data while consuming a large amount of power, even when the mobile terminal 200 is located in a building or the like and does not accurately receive a signal from a GPS satellite. If the positioning accuracy of the GPS is set to "low", information of the positioning accuracy of the GPS is stored in the sensor information management DB 226, and the mobile terminal 200 receives positioning requirements indicating that the accuracy is "low", the GPS that consumes a large amount of power is to be operated. However, the sensor 214 (public mobile phone line) of which the positioning accuracy is higher than the requested accuracy is in the ON state. Thus, the public mobile phone line is prioritized.

According to the present embodiment, the sensor usage information 480 holds a time to execute the positioning. When the mobile terminal 200 receives, from another server, positioning requirements that indicates that the accuracy of the positioning is "low" and the frequency of the positioning is "only once", the mobile terminal 200 does not turn on a sensor 214 matching the positioning requirements in order to execute the positioning. If the difference between the held positioning time and the current time is equal to or smaller than a certain threshold, the mobile terminal 200 can transmit previously acquired positioning data to the server instead of acquiring new positioning data. Thus, the mobile terminal 200 does not newly execute the positioning and can reduce the amount of power to be consumed.

According to the present embodiment, a time to previously execute the positioning is held. Thus, if the sensor adjuster 224 determines that the positioning accuracy of the GPS is "low", and a certain time threshold elapses, the mobile terminal 200 executes the positioning in accordance with the default values (for example, the positioning accuracy of the public mobile phone line<the positioning accuracy of the wireless LAN<the positioning accuracy of the GPS) and confirms the validity of the sensor accuracy management DB 226. Thus, even if the sensor adjuster 224 determines that the positioning accuracy of the GPS is lower than the positioning accuracy of the public mobile phone line, and the user moves to an outdoor location, the sensor adjuster 224 rechecks the relationships between the positioning accuracies and the sensors 214. The sensor adjuster 224 causes the GPS to operate in accordance with the default values when the positioning accuracy of the GPS is "high". The sensor adjuster 224 can accurately update the sensor accuracy management DB 226 on the basis of a time to execute the positioning and the positioning accuracy of the GPS.

Third Embodiment

In the aforementioned embodiments, the positioning requirement determination tables 430 and 530 are stored in the service position/user position accumulation DB 122. For example, the positioning requirement determination tables 430 and 530 may be stored in the sensor accuracy management DB 226 and the mobile terminal 200 may determine positioning accuracies (to be set) and frequencies (to be set) on the basis of information, transmitted from the server 100, of a distance between the mobile terminal 200 and a location at which a service is provided.

Figure 18:
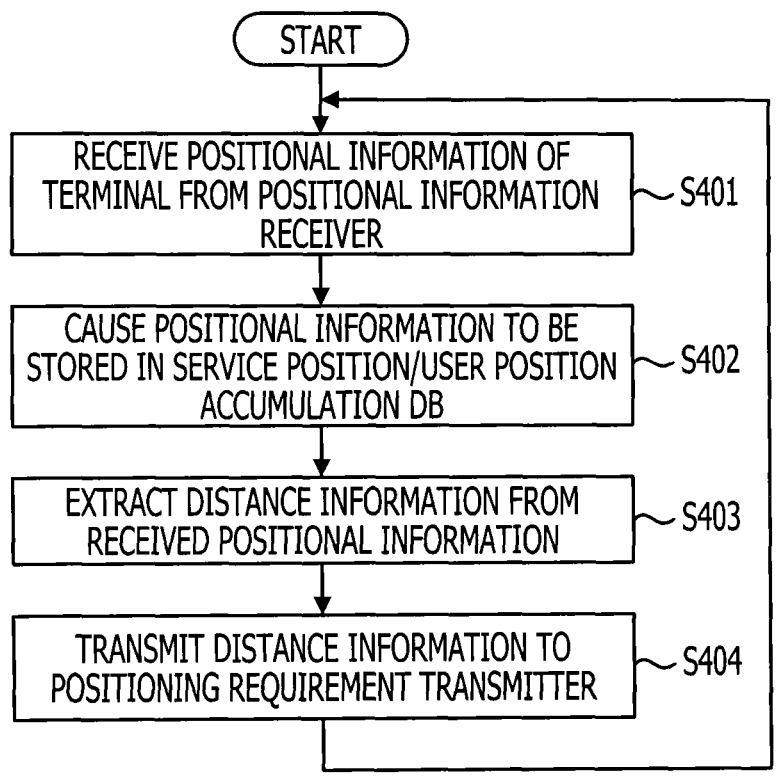
FIG. 18 is a second flowchart of a process that is executed by the positioning requirement determining unit.

FIG. 18 is a flowchart of a process that is executed by the positioning requirement determining unit 124.

In S401, the positioning requirement determining unit 124 receives positional information of the mobile terminal 200 from the positional information receiver 120. The positioning requirement determining unit 124 causes the process to proceed to S402.

In S402, the positioning requirement determining unit 124 causes the positional information, received from the positional information receiver 120, of the mobile terminal 200 to be stored in the service position/user position accumulation DB 122. The positioning requirement determining unit 124 causes the process to proceed to S403.

In S403, the positioning requirement determining unit 124 calculates, on the basis of the positional information (of the mobile terminal 200) received from the positional information receiver 120, a distance between the mobile terminal 200 and a location at which a service for transmitting data is provided. The positioning requirement determining unit 124 causes the process to proceed to S404.

In S404, the positioning requirement determining unit 124 transmits information (distance information) of the calculated distance to the positioning requirement transmitter 126. The positioning requirement determining unit 124 causes the process to return to S401.

Figure 19:
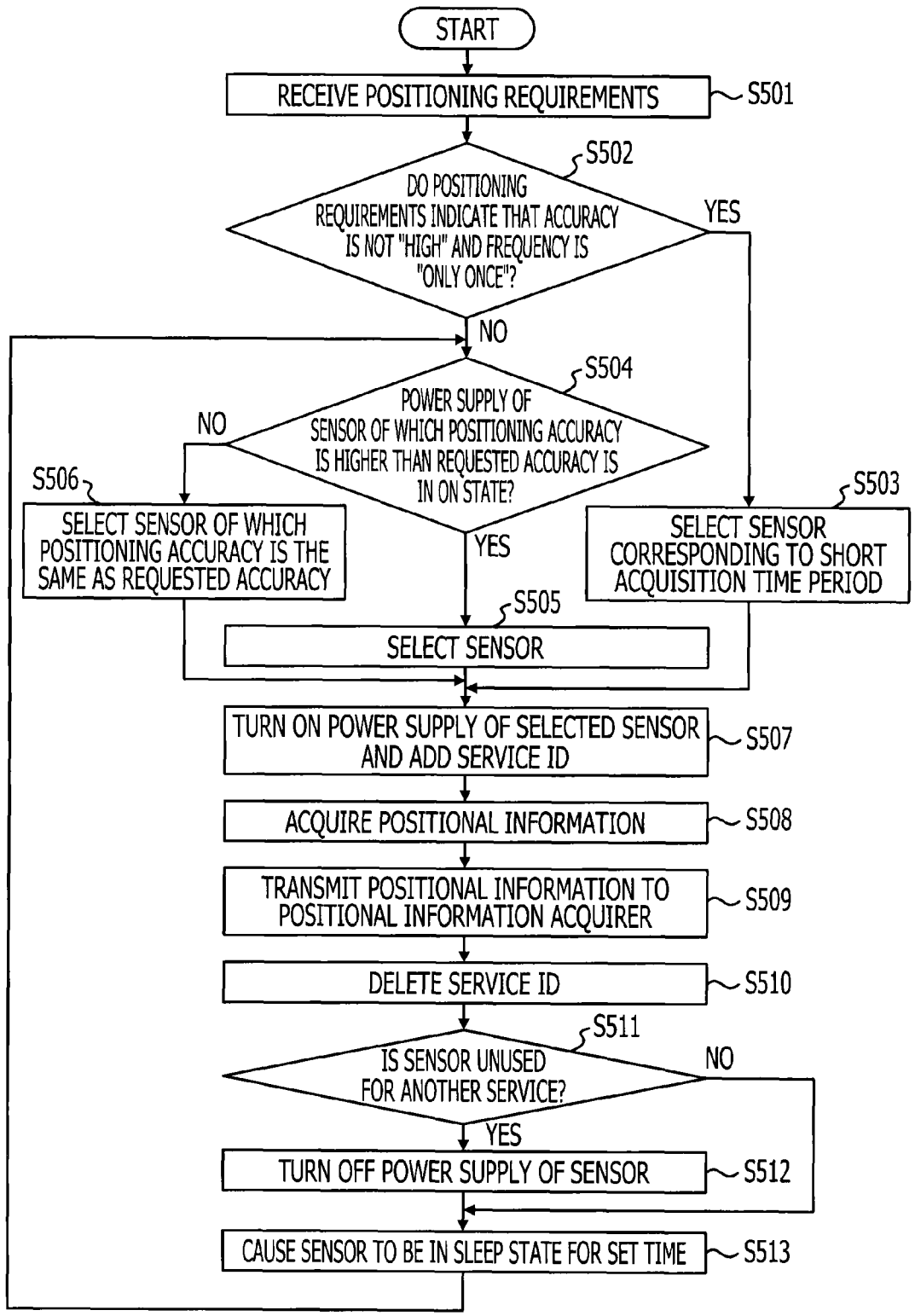
FIG. 19 is a fourth flowchart of a process that is executed by the sensor adjuster.

FIG. 19 is a flowchart of a process that is executed by the sensor adjuster 224.

In S501, the sensor adjuster 224 acquires the distance information. The sensor adjuster 224 causes the process to proceed to S502.

In S502, the sensor adjuster 224 references the positioning requirement determination table 430 or 530, determines positioning requirements on the basis of the acquired distance information, and determines whether or not the determined positioning requirements indicate that "the accuracy is not "high" and the frequency is "only once"". If the determined positioning requirements indicate that "the accuracy is not "high" and the frequency is "only once"", the sensor adjuster 224 causes the process to proceed to S503. If the determined positioning requirements do not indicate that "the accuracy is not "high" and the frequency is "only once"", the sensor adjuster 224 causes the process to proceed to S504.

In S503, the sensor adjuster 224 references the setting information 450 and selects a sensor 214 corresponding to a "short acquisition time period". The sensor adjuster 224 causes the process to proceed to S507.

In S504, the sensor adjuster 224 references the positioning requirements and determines whether or not a power supply of a sensor 214 of which a positioning accuracy is higher than a requested accuracy is in the ON state. If the power supply of the sensor 214 of which the positioning accuracy is higher than the requested accuracy is in the ON state, the sensor adjuster 224 causes the process to proceed to S505. If the power supply of the sensor 214 of which the positioning accuracy is higher than the requested accuracy is not in the ON state, the sensor adjuster 224 causes the process to proceed to S506.

In S505, the sensor adjuster 224 selects the sensor 214 of which the power supply is in the ON state and of which the positioning accuracy is higher than the requested accuracy. The sensor adjuster 224 causes the process to proceed to S507.

In S506, the sensor adjuster 224 references the positioning requirements and selects a sensor 214 of which a positioning accuracy is the same as the requested accuracy. The sensor adjuster 224 causes the process to proceed to S507.

In S507, if the power supply of the selected sensor 214 is not in the ON state, the sensor adjuster 224 turns on the power supply of the selected sensor 214 and adds a service ID to the sensor usage information 460. The sensor adjuster 224 causes the process to proceed to S508.

In S508, the sensor adjuster 224 acquires positional information from the selected sensor 214. The sensor adjuster 224 causes the process to proceed to S509.

In S509, the sensor adjuster 224 transmits the acquired positional information to the positional information acquirer 228. The sensor adjuster 224 causes the process to proceed to S510.

In S510, the sensor adjuster 224 deletes the service ID from the sensor usage information 460. The sensor adjuster 224 causes the process to proceed to S511.

In S511, the sensor adjuster 224 determines whether or not the sensor 214 is unused for another service. If the sensor 214 is unused for the other service, the sensor adjuster 224 causes the process to proceed to S512. If the sensor 214 is used for the other service, the sensor adjuster 224 causes the process to proceed to S513.

In S512, the sensor adjuster 224 turns off the power supply of the sensor. The sensor adjuster 224 causes the process to proceed to S513.

In S513, the sensor adjuster 224 causes the sensor 214 selected on the basis of the positioning requirements to be in a sleep state for a set time. The sensor adjuster 224 causes the process to return to S504.

According to the present embodiment, the positioning requirement determining unit 124 of the server 100 calculates a distance between the position of the mobile terminal 200 and a location at which a service is provided. Then, the positioning requirement transmitter 126 transmits information (distance information) of the calculated distance to the mobile terminal 200. The positioning requirement receiver 222 of the mobile terminal 200 receives the distance information. The positioning requirement receiver 222 determines positioning requirements on the basis of the received distance information and transmits the determined positioning requirements to the sensor adjuster 224. The sensor adjuster 224 references the sensor accuracy management DB 226 and selects a sensor 214 matching a positioning accuracy included in the received positioning requirements. The sensor adjuster 224 turns on the sensor 214 of which the positioning accuracy matches the positioning requirements. Then, the mobile terminal 200 executes the positioning. The mobile terminal 200 transmits positional information acquired by the positioning to the center server. After that, the sensor 214 is turned off on the basis of the frequency described in the positioning requirements until the positioning is next executed. The higher the accuracy of the positioning, the larger the amount of power to be consumed. Thus, if the positioning requirement (accuracy) transmitted from the center server is low, a low-accuracy sensor (consuming a small amount of power) 214 is used. The sensor 214 that is used by the mobile terminal 200 is changed on the basis of positioning requirements that vary depending on whether or not high-accuracy positional information is requested. Thus, it is effective to save power to be consumed by the mobile terminal 200.

Figure 20:
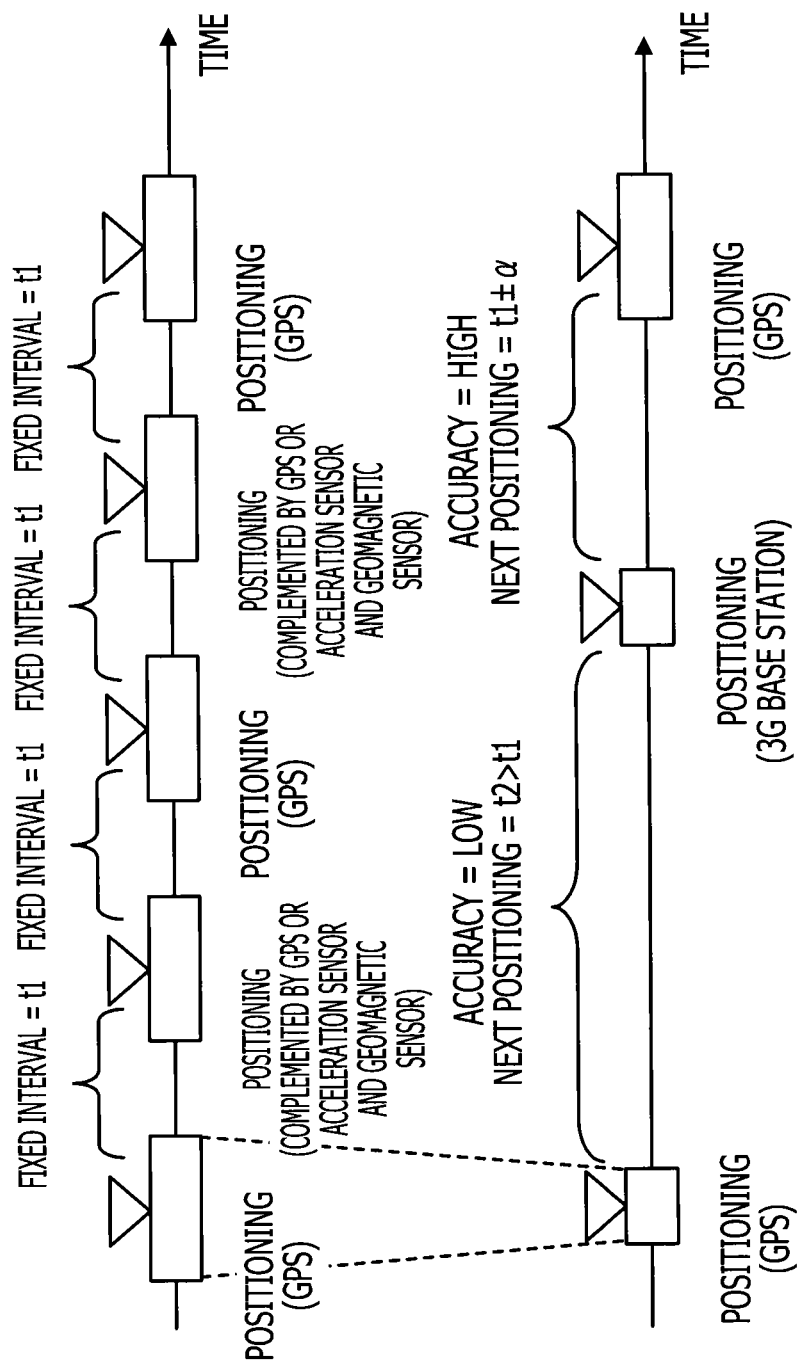
FIG. 20 is a first diagram describing effects of an embodiment.

FIG. 20 is a diagram illustrating effects of the present embodiment. According to the present embodiment, if a detail of a request provided for a service indicates that a positioning accuracy is "low", the mobile terminal 200 uses a power-saving sensor 214. An interval between times of the positioning can be increased on the basis of a detail (frequency) of the request provided for the service. If the number of GPS satellites transmitting signals that can be used for positioning is small, or positional information and the accuracy of the positional information are known, the difference between a measured position and the actual position is large, and the positioning requirement determining unit 124 can make a determination, for example, can determine that the mobile terminal 200 is sufficiently far from a service target range or the like, the result of the positioning is sufficient. In this case, a process that is repeated to cause a measured value to converge to a certain value is not executed. If a requested accuracy is low, the base station positioning can be executed, and a period of time to execute the positioning once can be reduced.

FIG. 21 is a diagram illustrating effects of the present embodiment. If the relationships between the positioning accuracies and the sensors 214 are fixed, a large amount of power is consumed and the accuracy of the positioning is low. According to the present embodiment, however, power can be saved and the accuracy of the positioning is high.

Figure 22:
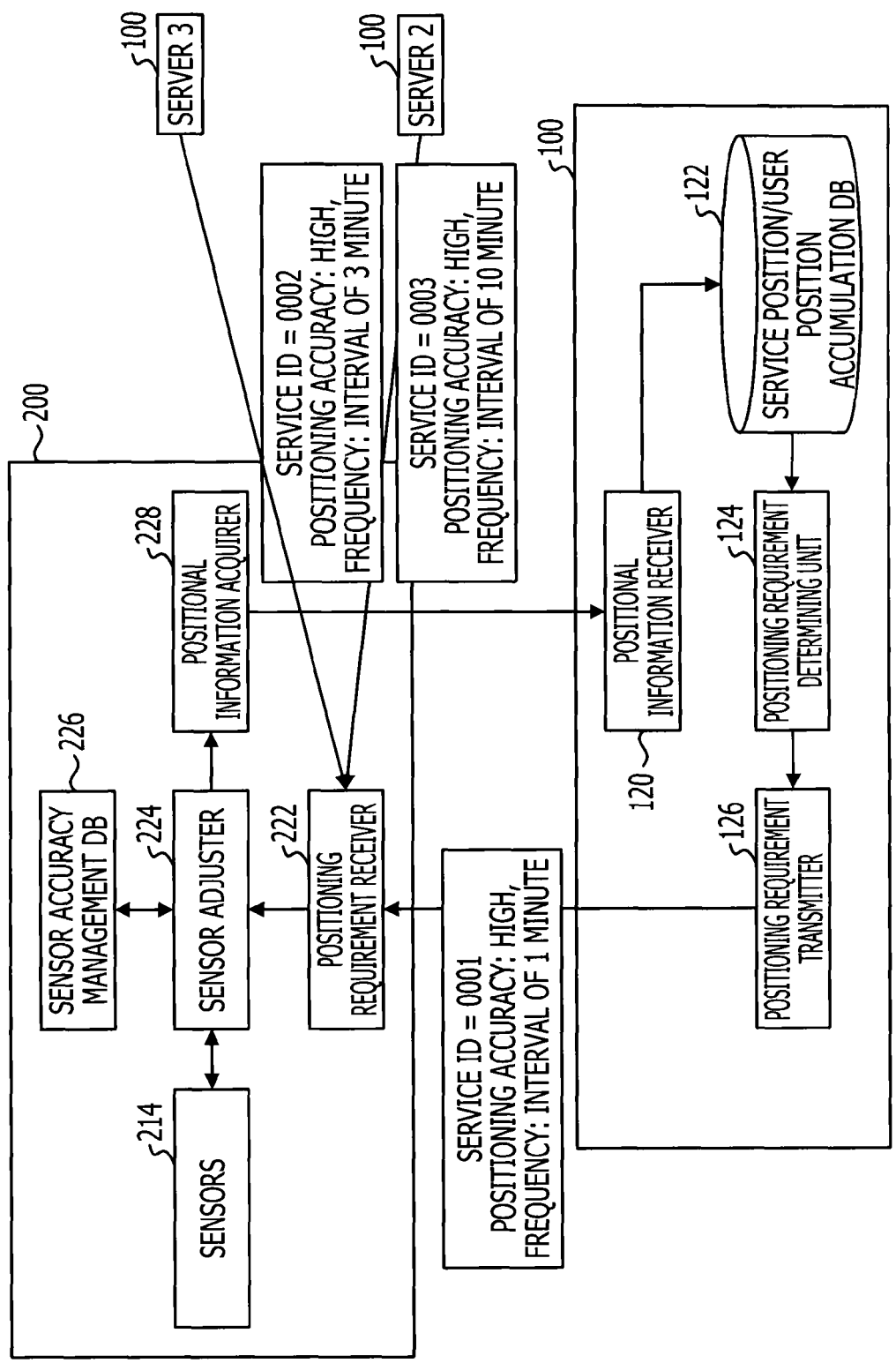
FIG. 22 is a third diagram describing an effect of the embodiment.

FIG. 22 is a diagram illustrating an effect of the present embodiment. According to the present embodiment, when positioning requirements are set from the plurality of servers, the relationships between the sensors 214 and currently provided positioning accuracies are updated by the sensor accuracy management DB. Thus, an appropriate positioning result can be provided.

The information processing system according to the embodiments is described. The information processing system, however, is not limited to the embodiments disclosed herein and may be variously modified and changed without departing from the scope of the claims. For example, when the sensor usage information 480 holds a time to execute positioning and the mobile terminal 200 receives, from another server, positioning requirements that indicate that the positioning accuracy is "low" and the frequency of the positioning is "only once", the mobile terminal 200 does not turn on a sensor 214 matching the positioning requirements and execute positioning, and can transmit previously acquired positioning data to the server if the difference between the held time to execute the positioning and the current time is equal to or smaller than a threshold. In this case, even if the frequency of the positioning indicates an "interval of 5 minutes", previously acquired positioning data may be transmitted in the first positioning, and the positioning may be executed after 5 minutes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method comprising:
specifying, by a server device that transmits data to a client device including a plurality of sensors that acquire positional information of the client device, a positioning condition corresponding to one of the plurality of sensors to sense the positional information based on association information associating each of the plurality of sensors with a distance between the client device and a predetermined location, wherein the server device transmits the data to the client device when the client device is located within the predetermined location; and
causing, based on the positioning condition, the client device to perform position sensing with a first sensor of plurality of the sensors having a first level of accuracy when the client device is located within the distance from the predetermined location and perform position sensing with a second sensor of the plurality of sensors having a second level of accuracy, which is less than the first level, when the client device is located outside of the distance from the predetermined location.

2. The method according to claim 1, wherein
the association information associates the distance with acquisition frequency information that indicates a frequency at which positional information of the client device is acquired, and
the method further comprises:
specifying acquisition frequency information corresponding to the positional information of the client device based on the association information; and
causing the client device to determine whether to operate or stop the sensor based on the acquisition frequency information specified by the server device.

3. The method according to claim 2, the method further comprising:
causing the client device to store a period of time to acquire the positional information in a memory; and
causing the client device to change a priority of the sensor selected by the client when a period of time for the sensor selected by the client to acquire the positional information is longer than the period of time stored in the memory.

4. The method according to claim 3, the method further comprising:
causing the client device to store, in the memory, the positional information and time information indicating a time when the positional information is acquired; and
causing the client device to determine whether to transmit the positional information stored in the memory or to transmit positional information acquired after the positional information stored in the memory is acquired.

5. The method according to claim 4, the method further comprising:
causing the client device to acquire positional information using the sensor selected by the client device when a given time threshold elapses after the positional information stored in the memory is acquired.

6. The method of claim 1, wherein
the positioning condition corresponds to a frequency at which the client device transmits positioning information to the server.

7. The method of claim 6, further comprising:
causing the client device to transmit positioning information at a first frequency when the client device is located within the distance from the predetermined location, and
causing the client device to transmit positioning information at a second frequency, which is less than the first frequency, when the client device is located outside of the distance from the predetermined location.

8. A server device that transmits data to a client device including a plurality of sensors that acquire positional information of the client device, the server device comprising:
a memory; and
a processor configured to execute a plurality of instructions stored in the memory, the instructions comprising:
specifying a positioning condition corresponding to one of the plurality of sensors to sense the positional information based on association information associating each of the plurality of the sensors with a distance between the client device and a predetermined location, wherein the server device transmits the data to the client device when the client device is located within the predetermined location; and
causing, based on the positioning condition, the client device to perform position sensing with a first sensor of plurality of the sensors having a first level of accuracy when the client device is located within the distance from the predetermined location and perform position sensing with a second sensor of plurality of the sensors having a second level of accuracy, which is less than the first level, when the device is located outside of the distance from the predetermined location.

9. A client device that acquires positional information using a sensor selected among a plurality of sensors, the client device comprising:
a memory; and
a processor configured to execute a plurality of instructions stored in the memory, the instructions comprising
receiving, from a server device that transmits data to the client device, a positioning condition corresponds to one of the plurality of sensors to sense the positional information based on association information associating each of the plurality of sensors with a distance between the client device and a predetermined location, wherein the server device transmits the data to the client device when the client device is located within the predetermined location, and performing, based on the positioning condition, position sensing with a first sensor of plurality of the sensors having a first level of accuracy when the client device is located within the distance from the predetermined location and position sensing with a second sensor of plurality of sensors having a second level of accuracy, which is less than the first level, when the client device is located outside of the distance from the predetermined location.

* * * * *